United States Patent
Cao et al.

(10) Patent No.: US 9,470,398 B2
(45) Date of Patent: Oct. 18, 2016

(54) COMPACT LIGHT ENGINE

(71) Applicants: Simon Cao, Shanghai (CN); Louis Chen, Shanghai (CN); Shengyuan Bai, Shanghai (CN)

(72) Inventors: Simon Cao, Shanghai (CN); Louis Chen, Shanghai (CN); Shengyuan Bai, Shanghai (CN)

(73) Assignee: Materion Corporation, Mayfield Heights, OH (US)

( * ) Notice: Subject to any disclaimer, the term of this patent is extended or adjusted under 35 U.S.C. 154(b) by 0 days.

(21) Appl. No.: 14/415,763

(22) PCT Filed: Jul. 22, 2013

(86) PCT No.: PCT/GB2013/051952
§ 371 (c)(1),
(2) Date: Jan. 20, 2015

(87) PCT Pub. No.: WO2014/016574
PCT Pub. Date: Jan. 30, 2014

(65) Prior Publication Data
US 2015/0204514 A1 Jul. 23, 2015

(30) Foreign Application Priority Data
Jul. 23, 2012 (GB) .................... 1213053.0

(51) Int. Cl.
| | |
|---|---|
| *F21V 9/14* | (2006.01) |
| *G02B 26/00* | (2006.01) |
| *G02B 27/28* | (2006.01) |
| *G03B 21/20* | (2006.01) |
| *G03B 33/12* | (2006.01) |
| *F21V 7/04* | (2006.01) |
| *F21V 9/16* | (2006.01) |

(52) U.S. Cl.
CPC . *F21V 9/14* (2013.01); *F21V 7/04* (2013.01); *F21V 9/16* (2013.01); *G02B 26/008* (2013.01); *G02B 27/283* (2013.01); *G02B 27/286* (2013.01); *G03B 21/204* (2013.01); *G03B 21/2073* (2013.01); *G03B 33/12* (2013.01)

(58) Field of Classification Search
CPC ............ G03B 21/204; G03B 21/2013; G03B 21/2066; H04N 9/3158; H04N 9/3161; H04N 9/3167; F21V 9/14; F21V 9/16
See application file for complete search history.

(56) References Cited

U.S. PATENT DOCUMENTS

| | | |
|---|---|---|
| 6,176,586 B1 | 1/2001 | Hirose et al. |
| 2007/0052928 A1 | 3/2007 | Maeda et al. |
| 2009/0034284 A1 | 2/2009 | Li et al. |
| 2011/0199580 A1* | 8/2011 | Hirata .................... G03B 21/20 353/31 |
| 2012/0081674 A1 | 4/2012 | Okuda |
| 2012/0140183 A1 | 6/2012 | Tanaka et al. |
| 2012/0327374 A1* | 12/2012 | Kitano .................. G03B 21/16 353/31 |

(Continued)

FOREIGN PATENT DOCUMENTS

EP        1 605 199 A2    12/2005

*Primary Examiner* — Sultan Chowdhury
(74) *Attorney, Agent, or Firm* — Richard M. Klein; Fay Sharpe LLP

(57) ABSTRACT

A light engine comprises: a wavelength conversion device, receiving source light of a first wavelength range and a first polarisation, generating light of a second wavelength range from a portion of the received source light, at least a portion of the second wavelength range being non-overlapping with the first wavelength range, the wavelength conversion device reflects output light comprising the generated light and comprises a polarisation converter that sets at least some of the output light to a second polarisation, different from the first polarisation; and a dichroic element, that receives the reflected output light and directs light of the first polarisation differently from light of the second polarisation.

36 Claims, 3 Drawing Sheets

(56) References Cited

U.S. PATENT DOCUMENTS

| | | | | |
|---|---|---|---|---|
| 2013/0010264 A1* | 1/2013 | Takahashi | H04N 9/3114 | 353/20 |
| 2013/0021582 A1* | 1/2013 | Fujita | G03B 21/204 | 353/31 |
| 2013/0343033 A1* | 12/2013 | Matsubara | G02B 26/008 | 362/19 |

* cited by examiner

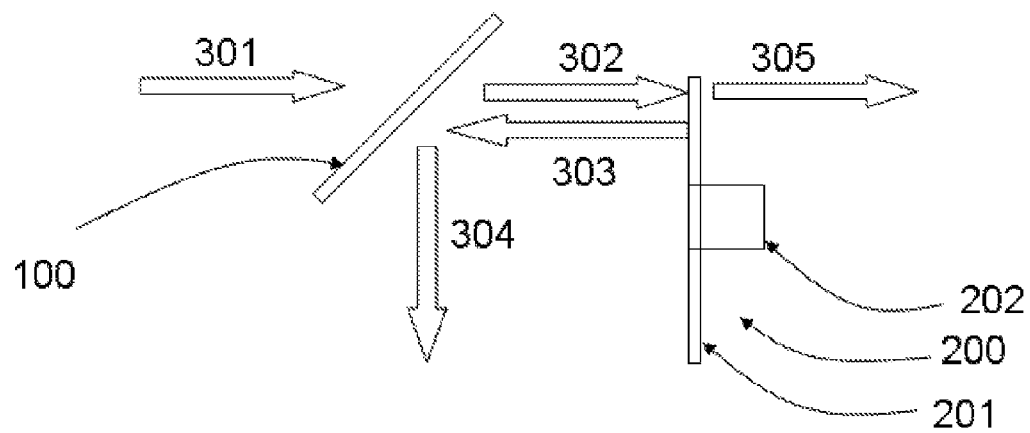
Fig. 1A – PRIOR ART
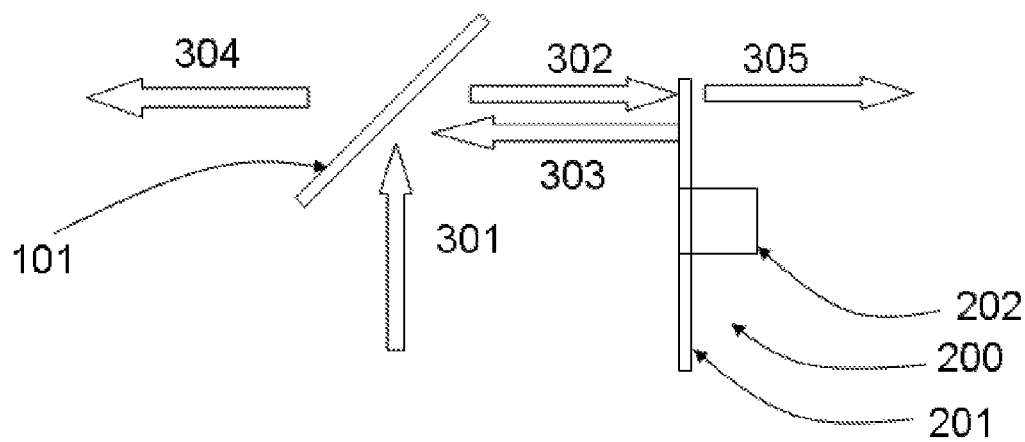
Fig 1B – PRIOR ART

COMPACT LIGHT ENGINE

TECHNICAL FIELD OF THE INVENTION

The invention relates to a light engine comprising a light source, wavelength conversion device and a dichroic element, to a method of operating such a light engine and to a method of generating light.

BACKGROUND TO THE INVENTION

A common design of light sources for projectors uses a phosphor wheel to generate light of different colours sequentially. Typically, a blue laser excites the phosphor wheel to generate green or red colour light. The phosphor wheel normally has some fan segments which contain different types of phosphor to convert the exciting blue light to a green, yellow or red colour.

The phosphor wheel can also have one or more gaps to pass the blue source light unconverted. A reflective type of phosphor wheel is often used, such that the excitation light and the emitted light stay on one side of the phosphor wheel. Then, a dichroic is used to separate the excitation light and emitted light.

An example of a known such design is shown in FIG. 1A, comprising a dichroic element 100 and a phosphor wheel 200. The phosphor wheel comprises a disc portion 201 and a motor 202 causing the disc portion 201 to rotate. The source blue light 301 is passed by the dichroic element 100 and the passed blue light 302 (also referred to as the excitation light) is focused on the disc 201 of the phosphor wheel 200. The disc portion 201 has at least one segment comprising a phosphor. The blue excitation light 302 incident on such segments is absorbed by the phosphor and converted light 303 (typically green or red) is emitted. To extract the green or red light 303, the dichroic element 100 is used. The dichroic element 100 reflects the emitted light 303 and the reflected light 304 is output. The disc portion can have multiple segments with different phosphors, such that the output light 304 may be provided with different colours in sequence, as the disc portion 201 is rotated.

The projector normally requires red, green and blue light to generate images. With blue excitation light 302, the phosphor wheel would normally generate green and red output light 304. However, the design of this light engine demands that the dichroic element 100 passes blue light to reach the phosphor wheel 200. Thus, the dichroic element 100 cannot normally reflect any blue light received.

Some known technologies create blue light in a different way. The disc portion 201 of the phosphor wheel 200 is designed with a gap segment. The gap segment allows the source light 304 to pass through the phosphor wheel (not being reflected) and provides secondary output light 305 of the same colour as the source light 301, for example blue light.

An alternative, known design of light engine is also shown in FIG. 1B. Similar light engine designs are discussed in U.S. Pat. No. 7,070,300. This light engine achieves the same function as that shown in FIG. 1A and mostly uses the same components. As a result, the same reference numerals have been used to identify the same features as shown in FIG. 1A. However, the arrangement of the components is different in FIG. 1B in comparison with FIG. 1A. Moreover, the dichroic element 101 is different from the dichroic element 100 of FIG. 1A.

The source light 301 is reflected by the dichroic element 101, causing excitation light 302 to be incident on the disc 202 of the phosphor wheel 200. The emitted light 304, being of a different colour from the excitation light 302, is then passed by the dichroic element 101. Again, the provision of light having the same colour as the source light 301 is achieved by the use of a gap segment in the disc portion 201 of the phosphor wheel 200. This allows secondary output light 305 of the same colour as the source light 301 to be provided.

Thus, for the designs shown in FIGS. 1A and 1B, there are two output light paths. For example, one is provided for green and red light and a second for blue light. This results in additional components, increasing size, complexity and cost.

SUMMARY OF THE INVENTION

Against this background, the present invention provides a light engine. In a first aspect the light engine comprises: a wavelength conversion device, arranged to receive source light of a first wavelength range and a first polarisation, to generate light of a second wavelength range from a portion of the received source light, at least a portion of the second wavelength range being non-overlapping with the first wavelength range, the wavelength conversion device being further arranged to reflect output light comprising the generated light, wherein the wavelength conversion device further comprises a polarisation converter configured to set at least some of the output light to a second polarisation, different from the first polarisation; and a dichroic element, arranged to receive the reflected output light, the dichroic element being configured to direct light of the first polarisation differently from light of the second polarisation.

In a second aspect the light engine comprises: a wavelength conversion device, arranged to receive source light of a first wavelength range and a first polarisation and configured selectively to generate light of a second wavelength range from a portion of the received source light, the second wavelength range being different from the first wavelength range, the wavelength conversion device being further arranged to reflect output light comprising the generated light, wherein the wavelength conversion device further comprises a polarisation converter configured to set at least some of the output light to a second polarisation, different from the first polarisation; an actuator, configured to cause motion of the wavelength conversion device, to select generation of light of the second wavelength range thereby; and a dichroic element, arranged to receive the reflected output light, the dichroic element being configured to direct light of the first polarisation differently from light of the second polarisation. Optionally, at least a portion of the second wavelength range is non-overlapping with the first wavelength range. In an alternative aspect, the present invention may be considered as a light engine, comprising a dichroic element arranged to cause source light of an initial polarisation to be incident upon a phosphor wheel, some of the source light being converted into light of a different colour, some of the source light being reflected without a colour change but with a change in polarisation and wherein the converted light and reflected source light are incident upon the dichroic element, the dichroic element being configured to direct the reflected source light differently than the source light of the initial polarisation.

The dichroic mirror therefore separates light not only according to its colour, but also according to its polarisation. Consequently, output light of the same colour as the source light can be achieved simply by changing the polarisation of the excitation light reflected by a reflective segment of the phosphor wheel. This results in a much more compact light engine, with reduced complexity and cost.

A number of preferable and optional features may be applicable to any one or more of these aspects.

Preferably, the dichroic element is further arranged to direct the source light to be incident upon the wavelength conversion device. In the preferred embodiment, the wavelength conversion device is configured to reflect a portion of the received source light, the output light thereby comprising the generated light of the second wavelength range and reflected source light of the first wavelength range. Here, the polarisation converter is beneficially configured to set the reflected source light of the first wavelength range to the second polarisation. Optionally, the first polarisation and second polarisation are orthogonal.

Advantageously, the dichroic element is configured to direct light of the first wavelength range and first polarisation differently from light of the first wavelength range and second polarisation.

In the preferred embodiment, the dichroic element is configured to direct light of the first wavelength range and first polarisation differently from light of the second wavelength range. In some embodiments, the dichroic element may be configured to pass light of the first wavelength range and first polarisation and to reflect light of the first wavelength range and second polarisation and light of the second wavelength range. In other embodiments, the dichroic element is configured to reflect light of the first wavelength range and first polarisation and to pass light of the second wavelength range and light of the first wavelength range and second polarisation.

In many embodiments, the second wavelength range is substantially non-overlapping with the first wavelength range. Then, the wavelength conversion device may comprise a phosphor element to generate light of the second wavelength range. The phosphor element may comprise any form of luminescent material.

Preferably, the wavelength conversion device is a wheel, a first portion of the wheel surface being configured to generate light of the second wavelength range. The wheel may be rotatable and, optionally, a motor may be provided to cause rotation of the wheel. The wheel may be formed of a disc-shaped portion as a substrate. The first portion of the wheel may comprise a phosphor coating on a segment of the surface of the substrate.

Optionally, the wavelength conversion device is further configured to generate light of a third wavelength range from a portion of the received source light. When the wavelength conversion device is a wheel, a first portion of the wheel surface may be configured to generate light of the second wavelength range and a second portion of the wheel surface may be configured to generate light of the third wavelength range.

In the preferred embodiment, a portion of the wheel surface is configured to reflect light of the first wavelength range. Prior art phosphor wheels requires an aperture in the disc portion of the wheel to allow excitation light to pass through the wheel. Typically, the transparent aperture is formed by removal of a portion of the phosphor wheel substrate. This causes a loss of balance of the wheel when it rotates. The improved disc-shaped substrate shape is employed, with an optional reflective coating on the substrate to reflect the light and cause it to pass though the polarisation converter. Advantageously, this may improve the balance of the wheel when rotated, facilitating its rotational ease. The phosphor wheel fabrication is also made more straightforward.

In the preferred embodiment, the light engine further comprises a light source, arranged to provide the source light. The present invention is also embodied in a projector comprising the light engine as described herein.

In a further aspect, the present invention may be found in a method of generating light, comprising: receiving source light of a first wavelength range and a first polarisation at a wavelength conversion device; generating light of a second wavelength range at the wavelength conversion device from a portion of the received source light, the second wavelength range being different from the first wavelength range, the wavelength conversion device therefore providing output light that comprises the generated light; setting the polarisation of at least some of the output light to a second polarisation, different from the first polarisation; reflecting the output light from the wavelength conversion device towards a dichroic element, the dichroic element being configured to direct light of the first polarisation differently from light of the second polarisation.

A yet further aspect of the present invention provides a method of generating light, comprising: receiving source light of a first wavelength range and a first polarisation at a wavelength conversion device; selectively generating light of a second wavelength range at the wavelength conversion device from a portion of the received source light, the second wavelength range being different from the first wavelength range, the wavelength conversion device therefore providing output light that comprises the generated light; moving the wavelength conversion device, to select generation of the light of a second wavelength range thereby; setting the polarisation of at least some of the output light to a second polarisation, different from the first polarisation; and reflecting the output light from the wavelength conversion device towards a dichroic element, the dichroic element being configured to direct light of the first polarisation differently from light of the second polarisation. Optionally, at least a portion of the second wavelength range is non-overlapping with the first wavelength range.

Another aspect of the invention provides a method of operating a light engine, comprising: receiving source light of an initial polarisation at a dichroic element, which causes the source light to be incident upon a phosphor wheel; converting some of the source light into light of a different colour at the phosphor wheel; reflecting some of the source light at the phosphor wheel without a colour change but with a change in polarisation; and causing the converted light and reflected source light to be incident upon the dichroic element, the dichroic element optically affecting the reflected source light differently than the source light of the initial polarisation.

Again, a number of preferable and optional features may be applicable to any one or more of these method-based aspects. Moreover, it will be understood that method steps implementing the operation of any of the apparatus features described above can also be optionally provided.

Preferably, the method further comprises: receiving the source light at the dichroic element; and directing the source light to be incident upon the wavelength conversion device using the dichroic element.

Advantageously, the output light comprises the generated light of the second wavelength range and reflected source light of the first wavelength range, such that the step of reflecting the output light comprises reflecting a portion of the source light received at the wavelength conversion device towards the dichroic element. Optionally, the step of setting the polarisation comprises setting the reflected source light of the first wavelength range to the second polarisation.

The dichroic element may be configured to direct light of the first wavelength range and first polarisation differently from light of the first wavelength range and second polarisation.

Beneficially, the dichroic element is configured to affect light of the first wavelength range and first polarisation optically differently from light of the second wavelength range. Then, the method may further comprise: passing light of the first wavelength range and first polarisation received at the dichroic element; and reflecting light of the first wavelength range and second polarisation and light of the second wavelength range received at the dichroic element. Alternatively, the method may further comprise: reflecting light of the first wavelength range and first polarisation received at the dichroic element; and passing light of the first wavelength range and second polarisation and light of the second wavelength range received at the dichroic element.

Preferably, the second wavelength range is substantially non-overlapping with the first wavelength range. Then, generating light of a second wavelength range optionally comprises using a phosphor element.

In the preferred embodiment, the wavelength conversion device is a wheel, a first portion of the wheel surface being configured to generate light of the second wavelength range.

In some embodiments, the method may further comprise: generating light of a third wavelength range at the wavelength conversion device from a portion of the received source light, the third wavelength range being different from the first wavelength range and the second wavelength range. Where the wavelength conversion device is a wheel, a first portion of the wheel surface may be configured to generate light of the second wavelength range and a second portion of the wheel surface may be configured to generate light of the third wavelength range. Advantageously, a portion of the wheel surface is configured to reflect light of the first wavelength range.

It will also be understood that the present invention is not limited to the specific combinations of features explicitly disclosed, but also includes any combination of features that are described independently and which the skilled person could implement together.

BRIEF DESCRIPTION OF THE DRAWINGS

The invention may be put into practice in various ways, a number of which will now be described by way of example only and with reference to the accompanying drawings in which:

FIG. 1A shows a first embodiment of an existing light engine;

FIG. 1B shows a second embodiment of an existing light engine;

DETAILED DESCRIPTION OF PREFERRED EMBODIMENTS

Figure 2:
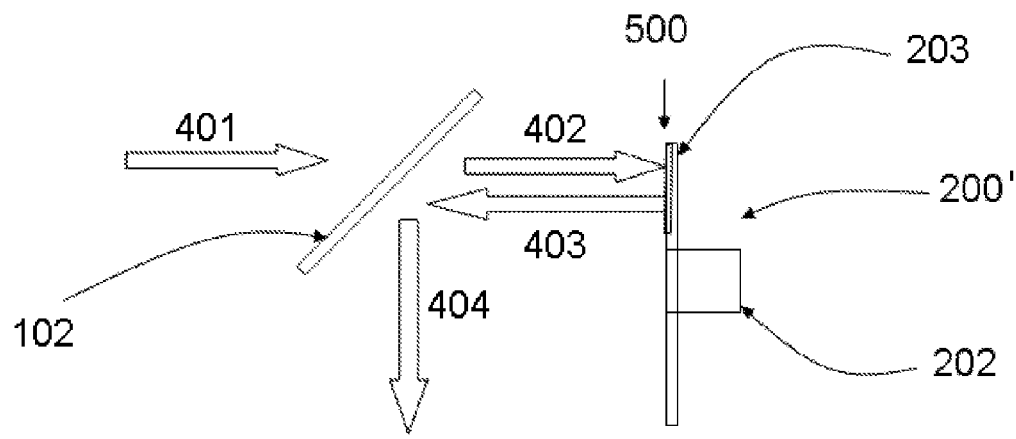
FIG. 2 shows a first embodiment of a light engine in accordance with the present invention.

Referring first to FIG. 2, there is shown a first embodiment of a light engine in accordance with the present invention. The light engine comprises: a dichroic element 102; and a phosphor wheel 200'. The phosphor wheel 200' comprises a motor 202; a disc portion 203; and a polarisation converter 500.

Source light 401 of a first colour is provided from a polarised source, such as a laser, which is typically polarised, for example as blue light with p polarization. We define the p polarization as linear polarization and the direction is in the plane of the paper. In contrast, s polarization is normal to the plane of the paper.

The properties of the dichroic element 102 are dependent not only on the wavelength of the incident light, but also the polarisation of that light. For instance, dichroic element 102 is designed to pass light of p polarization blue light to cause excitation light 402 to be incident and focused on the disc portion 203 of the phosphor wheel 200'. The disc portion 203 of the phosphor wheel has a plurality of segments. Some of the plurality of segments contain one or more different kinds of phosphor. Excitation light 402, which is typically blue, is incident on these segments and converted to light of green, yellow, red or some other colour. In this respect, the disc portion 203 is similar to the disc portion 201 shown in FIGS. 1A and 1B.

Beside these phosphor segments, the disc portion 203 of the phosphor wheel 200' has at least one other kind of segment. This segment does not include a phosphor. Rather, it comprises the polarization converter 500, which reflects p polarized light as s polarized light. In this way, the excitation light 402 is reflected together with emitted light 403, without a change in colour, but with a change in polarisation.

The dichroic element 102 reflects the s polarized blue light as well as the converted light 403 emitted by the phosphor on the disc portion 203, to form the final output light 404. For instance, the dichroic element may reflect the green and red light emitted by the phosphor on the disc portion 203, irrespective of the polarisation of that light.

Although embodiments of the invention have been described above, the skilled person may contemplate various modifications or substitutions.

It will be understood that the polarisation converter 500 need not rotate. The polarization converter is shown as a quarter wave plate. However, other variants are possible.

In the embodiment shown in FIG. 2, the polarisation converter 500 is attached to the phosphor wheel as one segment and rotates with the phosphor wheel. However, the skilled person will recognise that other embodiments are possible. For example, the polarisation converter 500 can be provided over the whole surface of the disc portion 203 of the phosphor wheel 200'. Alternatively, the polarisation converter 500 can be provided as a separate component to the phosphor wheel 200', as an insert between the dichroic element 102 and phosphor wheel 200'. Moreover, the polarisation converter 500 can be provided at any place between the disc portion 203 and the dichroic element 102 as shown in FIG. 3.

Figure 4:
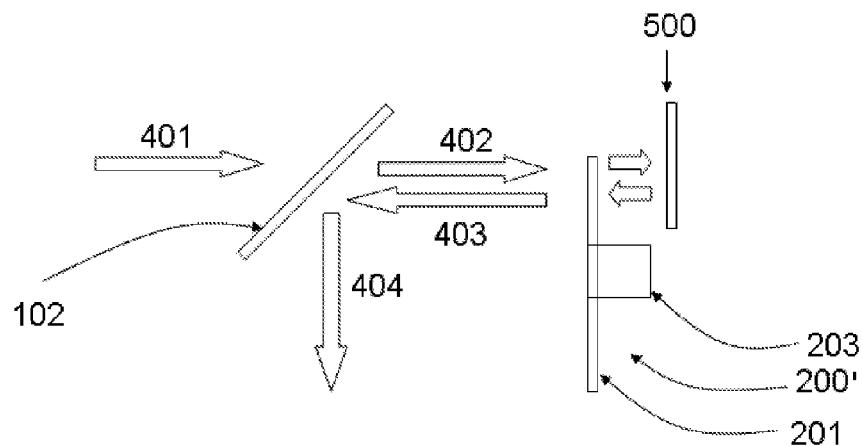
FIG. 4 shows a third embodiment of a light engine in accordance with the present invention.

Indeed, the polarisation converter 500 may be provided behind the phosphor wheel 200' as shown in FIG. 4. Similarly to the embodiment shown in FIG. 1A, the disc portion 203 of the phosphor wheel 200' includes gap segments and, when light passes through these gap segments, it is reflected with a change in polarisation by the polarisation converter 500.

Figure 3:
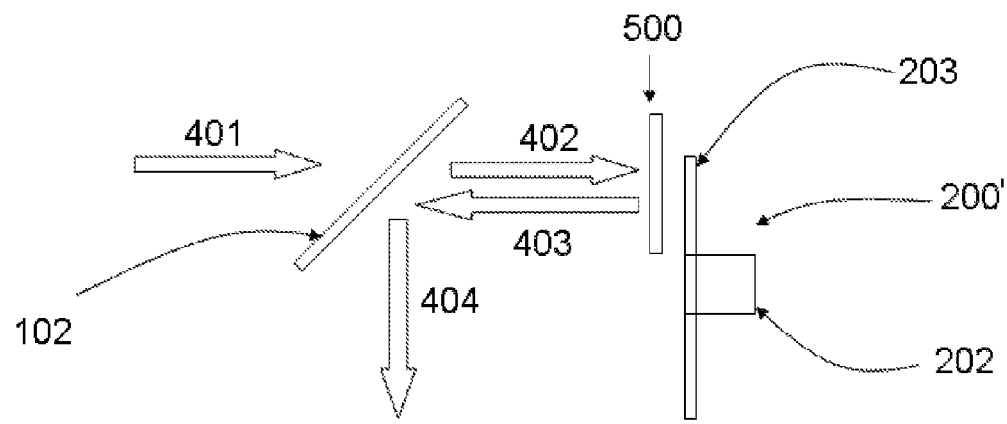
FIG. 3 shows a second embodiment of a light engine in accordance with the present invention.

It will also be understood that embodiments of the invention, based on those shown FIGS. 2, 3 and 4, but with an arrangement of the type shown in FIG. 1B will also be possible. In other words, these would be embodiments of the invention, based on those shown FIGS. 2, 3 and 4, but with a dichroic element designed to reflect source light of the source polarisation, but to pass light of a converted wavelength or light have the same colour as the source light, but with converted polarisation.

Figure 5:
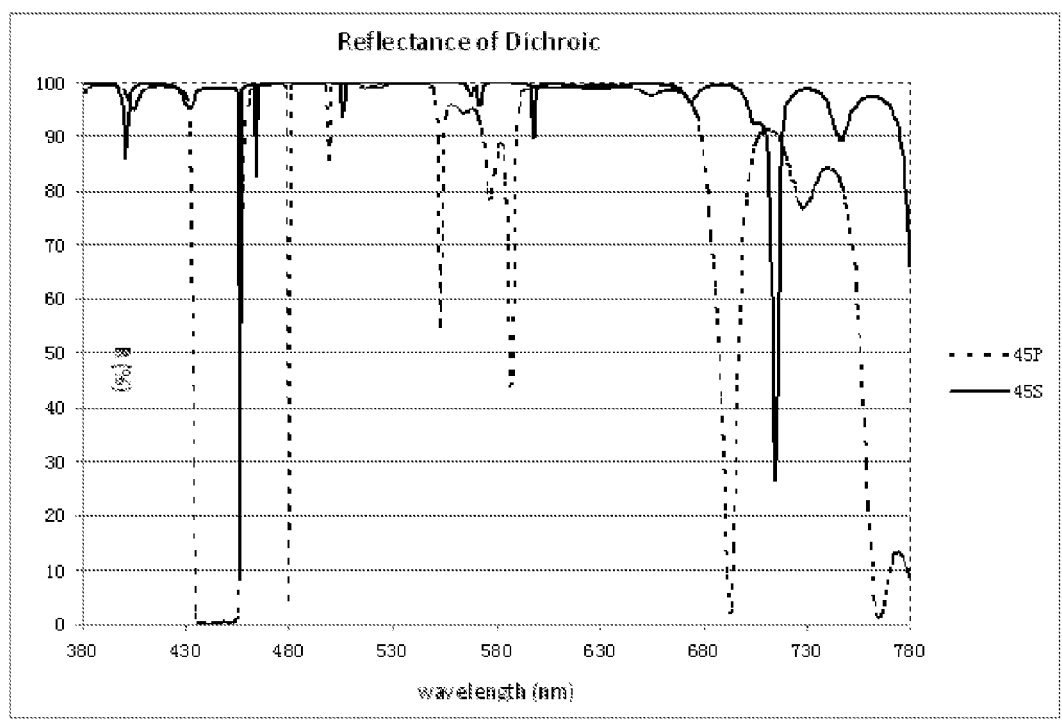
FIG. 5 shows a graph illustrating a sample reflectance of a dichroic element for use with any of the embodiments shown in FIGS. 2, 3 and 4.

A graph illustrating a sample reflectance of a dichroic element is shown in FIG. 5. It will be seen that s polarisation light is reflected across most wavelengths. However, the dichroic element is designed that p polarisation light is not reflected when the colour is blue. This design is based on the principle that, if the incident light beam angle is not zero (in other words, not normalized incidence), the incident plane is defined such that the s and p polarization light will have different reflectance. Other reflectance profiles for the dichroic element are also possible, within the understanding of the skilled person.

Although s polarisation and p polarisation of light have been used as examples, the skilled person will understand that other polarisations can be used. Similarly, other colour combinations can be used with different phosphors (or other kinds of wavelength conversion materials) being employed accordingly. The present invention may also be applicable to wavelength conversion devices other than phosphor wheels, for example colour wheels or other non-rotatable devices. Whilst the light source advantageously comprises a part of the compact light engine, it will be understood that the invention can be implemented without the light source in place, but with a suitable optical input to receive the source light.

The invention claimed is:

1. A light engine, comprising:
a wavelength conversion device, arranged to receive source light of a first wavelength range and a first polarisation, to generate light of a second wavelength range from a portion of the received source light, at least a portion of the second wavelength range being non-overlapping with the first wavelength range, the wavelength conversion device being further arranged to reflect output light comprising the generated light, wherein the wavelength conversion device comprises (i) a disc portion and (ii) a polarisation converter configured to set at least some of the output light to a second polarization that is different from the first polarisation; and
a dichroic element, arranged to receive the reflected output light, the dichroic element being configured to direct light of the first polarisation differently from light of the second polarization, the polarisation converter being located between the disc portion and the dichroic element.

2. A light engine, comprising:
a wavelength conversion device, arranged to receive source light of a first wavelength range and a first polarisation and configured selectively to generate light of a second wavelength range from a portion of the received source light, the second wavelength range being different from the first wavelength range, the wavelength conversion device being further arranged to reflect output light comprising the generated light, wherein the wavelength conversion device comprises (i) a disc portion and (ii) a polarisation converter configured to set at least some of the output light to a second polarisation that is different from the first polarisation;
an actuator, configured to cause motion of the wavelength conversion device, to select generation of light of the second wavelength range thereby; and
a dichroic element, arranged to receive the reflected output light, the dichroic element being configured to direct light of the first polarisation differently from light of the second polarisation, the polarisation converter being located between the disc portion and the dichroic element.

3. The light engine of claim 2, wherein at least a portion of the second wavelength range is non-overlapping with the first wavelength range.

4. The light engine of claim 1, wherein the dichroic element is further arranged to direct the source light to be incident upon the wavelength conversion device.

5. The light engine of claim 1, wherein the wavelength conversion device is configured to reflect a portion of the received source light, the output light thereby comprising the generated light of the second wavelength range and reflected source light of the first wavelength range.

6. The light engine of claim 5, wherein the polarisation converter is configured to set the reflected source light of the first wavelength range to the second polarisation.

7. The light engine of claim 5, wherein the dichroic element is configured to direct light of the first wavelength range and first polarisation differently from light of the first wavelength range and second polarisation.

8. The light engine of claim 1, wherein the dichroic element is configured to direct light of the first wavelength range and first polarisation differently from light of the second wavelength range.

9. The light engine of claim 8, wherein the dichroic element is configured to pass light of the first wavelength range and first polarisation and to reflect light of the first wavelength range and second polarisation and light of the second wavelength range.

10. The light engine of claim 8, wherein the dichroic element is configured to reflect light of the first wavelength range and first polarisation and to pass light of the second wavelength range and light of the first wavelength range and second polarisation.

11. The light engine of claim 1, wherein the second wavelength range is substantially non-overlapping with the first wavelength range.

12. The light engine of claim 11, wherein the wavelength conversion device comprises a phosphor element to generate light of the second wavelength range.

13. The light engine of claim 1, wherein the wavelength conversion device is a wheel, a first portion of the surface of the disc portion being configured to generate light of the second wavelength range.

14. The light engine of claim 1, wherein the wavelength conversion device is further configured to generate light of a third wavelength range from a portion of the received source light.

15. The light engine of claim 14, wherein the wavelength conversion device is a wheel, a first portion of the surface of the disc portion being configured to generate light of the second wavelength range and a second portion of the surface of the disc portion being configured to generate light of the third wavelength range.

16. The light engine of claim 13, wherein a portion of the surface of the disc portion is configured to reflect light of the first wavelength range.

17. A light engine, comprising a dichroic element arranged to cause source light of an initial polarisation to be incident upon a phosphor wheel that comprises (i) a disc portion and (ii) a polarisation converter, some of the source light being converted into light of a different color, some of the source light being reflected without a color change but with a change in polarisation and wherein the converted light and reflected source light are incident upon the dichroic element, the dichroic element being configured to direct the reflected source light differently than the source light of the initial polarisation, wherein the polarisation converter is between the dichroic element and the disc portion.

18. The light engine of claim 1, further comprising:
a light source, arranged to provide the source light.

19. A projector comprising the light engine of claim 1.

20. A method of generating light, comprising:
passing source light of a first wavelength range and a first polarisation through a dichroic element to be received at a wavelength conversion device that comprises (i) a disc portion and (ii) a ploarisation converter;
generating light of a second wavelength range at the wavelength conversion device from a portion of the received source light, at least a portion of the second wavelength range being non-overlapping with the first wavelength range, the wavelength conversion device therefore providing output light that comprises the generated light;
setting the polarisation of at least some of the output light to a second polarisation that is different from the first polarisation using the polarisation converter; and
reflecting the output light from the wavelength conversion device towards the dichroic element, the dichroic element being configured to direct light of the first polarisation differently from light of the second polarisation, wherein the polarisation converter is between the dichroic element and the disc portion.

21. A method of generating light, comprising:
receiving source light of a first wavelength range and a first polarisation at a wavelength conversion device that comprises (i) a disc portion and (ii) a polarisation converter;
selectively generating light of a second wavelength range at the wavelength conversion device from a portion of the received source light, the second wavelength range being different from the first wavelength range, the wavelength conversion device therefore providing output light that comprises the generated light;
moving the wavelength conversion device, to select generation of the light of the second wavelength range thereby;
setting the polarisation of at least some of the output light to a second polarisation that is different from the first polarisation; and
reflecting the output light from the wavelength conversion device towards a dichroic element, the dichroic element being configured to direct light of the first polarisation differently from light of the second polarisation, wherein the polarisation converter is between the dichroic element and the disc portion.

22. The method of claim 21, wherein at least a portion of the second wavelength range is non-overlapping with the first wavelength range.

23. The method of claim 20, further comprising:
receiving the source light at the dichroic element; and
directing the source light to be incident upon the wavelength conversion device using the dichroic element.

24. The method of claim 20, wherein the output light comprises the generated light of the second wavelength range and reflected source light of the first wavelength range, such that the step of reflecting the output light comprises reflecting a portion of the source light received at the wavelength conversion device towards the dichroic element.

25. The method of claim 24, wherein the step of setting the polarisation comprises setting the reflected source light of the first wavelength range to the second polarisation.

26. The method of claim 24, wherein the dichroic element is configured to direct light of the first wavelength range and first polarisation differently from light of the first wavelength range and second polarisation.

27. The method of claim 20, wherein the dichroic element is configured to affect light of the first wavelength range and first polarisation optically differently from light of the second wavelength range.

28. The method of claim 27, further comprising:
passing light of the first wavelength range and first polarisation received at the dichroic element; and
reflecting light of the first wavelength range and second polarisation and light of the second wavelength range received at the dichroic element.

29. The method of claim 27, further comprising:
reflecting light of the first wavelength range and first polarisation received at the dichroic element; and
passing light of the first wavelength range and second polarisation and light of the second wavelength range received at the dichroic element.

30. The method of claim 20, wherein the second wavelength range is substantially non-overlapping with the first wavelength range.

31. The method of claim 30, wherein generating light of a second wavelength range comprises using a phosphor element.

32. The method of claim 20, wherein the wavelength conversion device is a wheel, a first portion of the surface of the disc portion being configured to generate light of the second wavelength range.

33. The method of claim 20, further comprising:
generating light of a third wavelength range at the wavelength conversion device from a portion of the received source light, the third wavelength range being different from the first wavelength range and the second wavelength range.

34. The method of claim 33, wherein the wavelength conversion device is a wheel, a first portion of the surface of the disc portion being configured to generate light of the second wavelength range and a second portion of the surface of the disc portion being configured to generate light of the third wavelength range.

35. The method of claim 32, wherein a portion of the surface of the disc portion is configured to reflect light of the first wavelength range.

36. A method of operating a light engine, comprising:
receiving source light of an initial polarisation at a dichroic element, which causes the source light to be incident upon a phosphor wheel that comprises (i) a disc portion and (ii) a polarisation converter;
converting some of the source light into light of a different color at the phosphor wheel;
reflecting some of the source light at the phosphor wheel without a color change but with a change in polarisation; and
causing the converted light and reflected source light to be incident upon the dichroic element, the dichroic element directing the reflected source light differently than the source light of the initial polarisation, wherein the polarisation converter is between the dichroic element and the disc portion.

* * * * *